United States Patent [19]

Rosaen

[11] Patent Number: 4,548,235

[45] Date of Patent: Oct. 22, 1985

[54] FLUID HANDLING DEVICE

[76] Inventor: Nils O. Rosaen, 2139 Heide, Troy, Mich. 48084

[21] Appl. No.: 666,188

[22] Filed: Oct. 29, 1984

Related U.S. Application Data

[63] Continuation-in-part of Ser. No. 523,109, Aug. 15, 1983.

[51] Int. Cl.⁴ ............................................. F16K 37/00
[52] U.S. Cl. .................................... 137/557; 137/242; 137/542; 116/271
[58] Field of Search ............ 137/242, 557, 542, 543.13; 116/DIG. 7, DIG. 21, 271, 274, 277; 73/744

[56] References Cited

U.S. PATENT DOCUMENTS

| | | | |
|---|---|---|---|
| 1,675,849 | 7/1928 | Fultz | 137/557 |
| 3,422,791 | 1/1969 | Rosaen | 116/271 |
| 4,234,010 | 11/1980 | Jenkins et al. | 137/242 |

FOREIGN PATENT DOCUMENTS 1394120  5/1975  United Kingdom ................ 137/542

*Primary Examiner*—A. Michael Chambers
*Attorney, Agent, or Firm*—Gifford, VanOphem, Sheridan & Sprinkle

[57] ABSTRACT

The present invention provides a fluid handling device which operates as a combination check valve and fluid flow meter. The device includes a housing having an inlet and outlet and a fluid passageway formed therebetween. The housing forms a valve seat in series with the fluid passageway while a valve member movable between an open and closed position cooperates with the valve seat to open and close the fluid passageway. A tapered surface on the valve member forms a variable area opening at the valve seat which increases in area as the valve member moves from its closed and towards its open position while a compression spring urges the valve member towards its closed position. An indicator needle is mechanically connected to the valve member and reduces an exteriorly visible signal of the position of the valve member which, in turn, is representative of the fluid flow rate through the device. In addition, a seal member is secured to the housing around the valve seat and sealingly engages the valve member between its closed position and a partially open position. This seal member, which forms the surface between the valve member, also wipes and cleans the valve member as it moves between its closed and partially open position to prevent false readings from accumulated dirt on the valve member as well as enabling the device to indicate very small fluid flow rates.

10 Claims, 5 Drawing Figures

FLUID HANDLING DEVICE

CROSS REFERENCE TO RELATED APPLICATIONS

This application is a continuation-in-part of application Ser. No. 523,109 entitled FLUID HANDLING DEVICE, filed Aug. 15, 1983, and now abandoned.

BACKGROUND OF THE INVENTION

I. Field of the Invention

The present invention relates generally to fluid handling devices and, more particularly, to a combination check valve and flow meter.

II. Description of the Prior Art

There are a number of previously known check valves which use a spring bias valve member to prevent reverse flow through the valve. Similarly, there are a number of previously known fluid flow meters which employ a variable area orifice for measuring the fluid flow rate. Many of these previously known fluid flow meters use a pivotal vane or tapered needle to vary the area of the orifice opening.

In the above-identified copending patent application, a combination check valve and fluid flow meter is disclosed. In some applications, however, dirt accumulation on the valve member or valve seat can result in false flow readings. Furthermore, an excessive back pressure can result in back flow leakage through the check valve.

SUMMARY OF THE PRESENT INVENTION

The present invention provides a combination check valve and fluid flow meter which not only eliminates the possibility of false flow rate readings but also is capable of withstanding high back pressures.

In brief, the device of the present invention comprises a housing having an inlet and an outlet and a fluid passageway formed therebetween. A cooperating valve and valve seat are contained within the housing so that the valve seat forms a fluid port in series with the passageway. The valve member is movable between an open and a closed position with respect to the seat so that, with the valve member in its closed position, the valve member closes the fluid port and prevents reverse fluid flow through the fluid passageway. A spring urges the valve member towards its closed position while fluid flow from the inlet and to the outlet moves the valve member against the force of the spring and towards its open position.

The valve member of the present invention includes a relatively short cylindrical portion which terminates in a tapered or frusto-conical surface and the tapered surface cooperates with an annular seal mounted to the valve seat to provide a variable area opening between the seal and the valve member. The area of this valve opening increases substantially linearly with the movement of the valve member from its closed and towards its open position.

An indicator assembly is mechanically coupled to the valve member to produce a signal visible exteriorly of the housing of the position of the valve member and thus representative of the fluid flow rate through the device. In the preferred form of the invention, the indicating means includes an indicator shaft rotatably mounted to and extending from the interior and to the exterior of the housing. An arm is secured to the interior end of the shaft and abuts against the valve member so that movement of the valve member rotates the indicator shaft through the arm. An indicator needle is secured to the other or exterior end of the indicator shaft and cooperates with an indicia plate secured to the housing to provide a signal of the rotational position of the shaft and thus of the fluid rate through the device.

The annular seal which is mounted to the housing around the valve seat sealingly engages the cylindrical portion of the valve member as the valve member moves between a closed and a partially open position. In addition to forming the orifice opening with the valve member, the seal wipes and cleans the valve member thereby eliminating any accumulation of dirt or debris of the valve member at its junction with the valve seat. By cleaning the valve member, positive seating of the valve member in its closed position is obtained which eliminates any possibility of false flow rate readings.

The valve member also preferably includes a planar surface which is substantially perpendicular to the direction of travel of a valve member. This planar surface flatly abuts against a planar surface in the valve housing when the valve member is in its closed position. A further annular seal is carried by the valve member or valve seat at the junction between the planar surfaces. This further seal thus provides positive seating of the valve member against the housing and eliminates all leakage through the port despite high back pressures.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
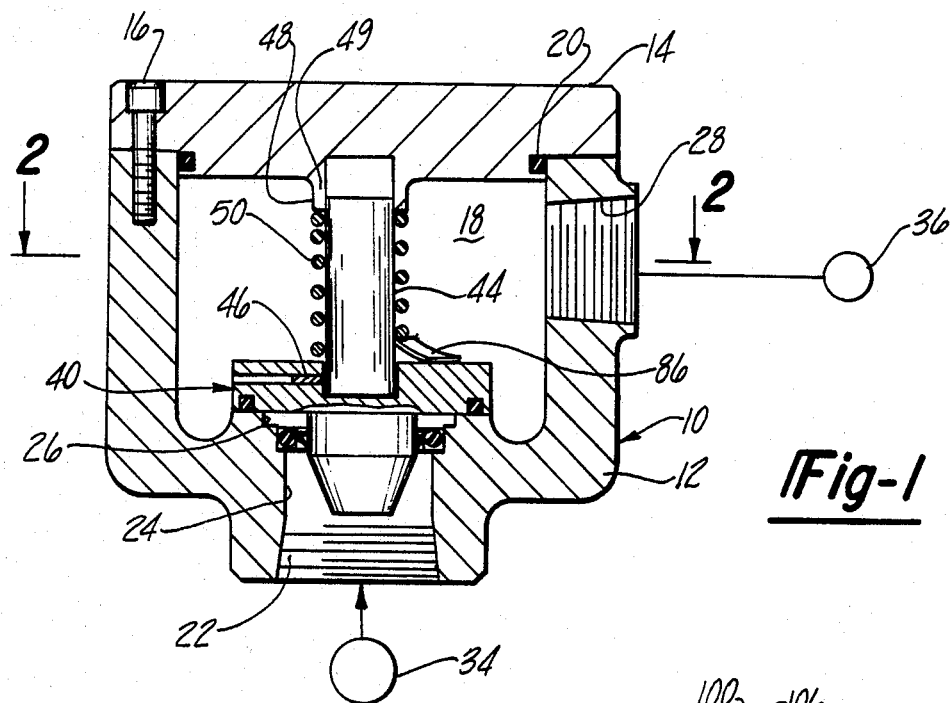
FIG. 1 is a longitudinal sectional view illustrating a preferred embodiment of the present invention.

With reference first to FIG. 1 a preferred embodiment of the fluid handling device of the present invention is thereshown and comprises a housing 10. The housing 10 includes both a body 12 and a cover 14 which is secured to the top of the body 12 by conventional fasteners, such as bolts 16. With the cover 14 secured to the body 12, the housing 10 forms an interior housing chamber 18 and a fluid seal 20 between the cover 14 and body 12 prevents fluid leakage from the chamber 18.

Still referring to FIG. 1, an inlet 22 having a cylindrical interior surface 24 is formed at the bottom of the body 12. The inlet 22 is open to the housing chamber 18 through an annular valve seat 26 which extends generally radially outwardly with respect to the cylindrical surface 24. A fluid outlet 28 is formed on one side of the body 12 and this outlet 28 is also open to the housing chamber 18. Consequently, the housing chamber 18 together with the valve seat 26 forms a fluid passageway between the inlet 22 and outlet 28. Both the inlet 22 and outlet 28 are internally threaded for connection with standard fittings. A pump or other pressure source 34 is fluidly connected to the inlet 22 while a fluid receiver 36 is fluidly connected to the outlet 28.

Still referring to FIG. 1, a generally cylindrical valve member 40 has its top secured to an elongated guide pin 44 by a set screw 46 or the like so that the pin 44 extends axially outwardly from the top of the valve member 40. The other end of the guide pin 44 is axially slidably mounted within a cylindrical boss 48 on the cover 14 so that the guide pin 44 and valve member 40 are aligned with the inlet 22. A compression spring 50 extends around the guide pin 44 and this spring 50 is compressed between the boss 48 and the valve member 40 so that it resiliently urges the valve 40 towards the inlet 22 and thus towards the valve seat 26. In addition, a pressure relief port 49 is formed in the boss 48 to allow the guide pin 44 to freely slide within the boss 48.

Figure 3:
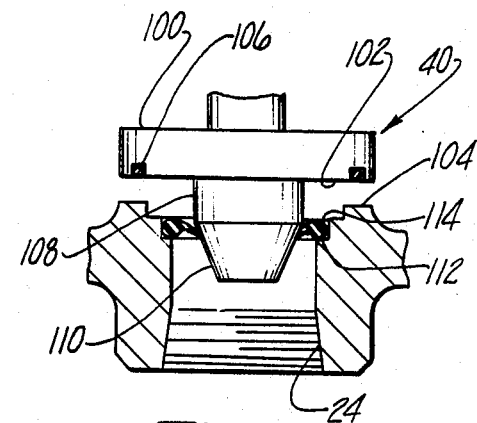
FIG. 3 is a fragmentary view illustrating the valve member in a partially open position.

Referring now to FIG. 3 the valve member 40 includes an upper enlarged diameter cylindrical portion 100 having a lower planar surface 102. This surface 102 substantially flatly abuts against a planar annular surface 104 in the body 12 when the valve member 40 is in its closed position. Preferably, an O-ring 106 is carried within a groove in the valve member surface 102 to enhance the fluid seal between the valve member 40 and the body 12 when the valve member 40 is in its closed position as shown in FIG. 1. This O-ring prevents reverse flow through the device despite high back pressures.

Still referring to FIG. 3, the valve member 40 further includes a reduced diameter cylindrical portion 108 and a lowered tapered or frusto-conical portion 110 so that the reduced diameter portion 108 is positioned in between the tapered portion 110 and the enlarged diameter portion 100 of the valve member. In addition, the frusto-conical portion 110 extends into the housing inlet 22.

An annular seal 112 having a radially inwardly extending flap is mounted within an annular groove 114 formed around the valve seat 26. The seal 112 is dimensioned so that the flap of the seal 112 engages the reduced diameter cylindrical portion 108 of the valve member 40 as the valve member 40 moves between its closed position, illustrated in FIG. 1, and a partially opened position, illustrated in FIG. 3, for a reason to be subsequently described.

Figure 4:
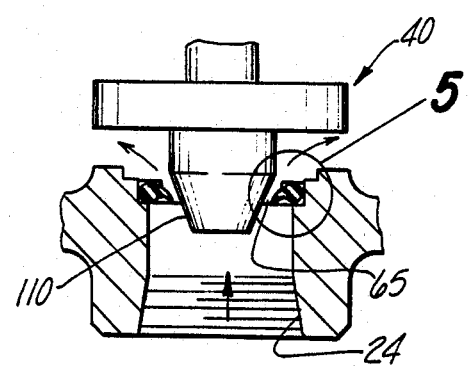
FIG. 4 is a view similar to FIG. 3 but illustrating the valve member in an open position.
Figure 5:
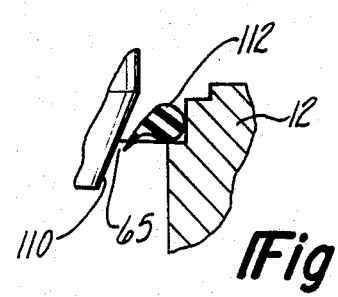
FIG. 5 is a view taken along circle 5—5 in FIG. 4 and enlarged for clarity.

With reference now to FIGS. 1, and 3-5, the valve member 40 is movable between the closed position, shown in solid line in FIG. 1, to a partially opened position shown in FIG. 3 and to an open position shown in FIG. 4. As the valve member moves between its closed position and its partially open position, the seal 112 maintains sealing contact with the valve member 40 and thus prevents fluid communication between the inlet 22 and outlet 28.

Conversely, as the valve member 40 moves from its partially open position (FIG. 3) and to an open position (FIG. 4), the valve member 40 forms an annular opening 65 between it and its seal 112 and establishes fluid communication between the inlet 22 and outlet 28. Conversely with the valve member in its closed position or partially open position, the seal 112 together with the O-ring 106 blocks the flow from the inlet 22 and to the outlet 28.

The frusto-conical or tapered portion 110 of the valve member 40 cooperates with the seal 112 on the valve seat 26 to form the annular opening 65 which varies in area in dependence upon the axial position of the valve member 40. Thus, with the valve 40 only slightly opened past its partially opened position, the area of the opening 65 is relatively small. Conversely, as the valve member moves towards a more open position, i.e. more towards the cap 114, the space in between the valve member surface 110 and the seal 112 increases thus providing an annular opening 65 of greater area.

In operation, fluid flow from the pump or pressure source 34 and to the inlet 22 forces the valve member 40 upwardly against the force of the compression spring 50 thus opening the valve member 40 past its partially opened position and enabling fluid flow from the inlet 22, to the outlet 28 and ultimately to the fluid receiver 36. The in fluid urges the valve member 40 towards its open position until the area of the opening 65 is sufficient to accommodate the fluid flow rate into the housing 22 while maintaining the compression of the spring 50 in a state of equilibrium. Consequently, the axial position of the valve member 40 is representative of the fluid flow rate through the fluid handling device 10.

Figure 2:
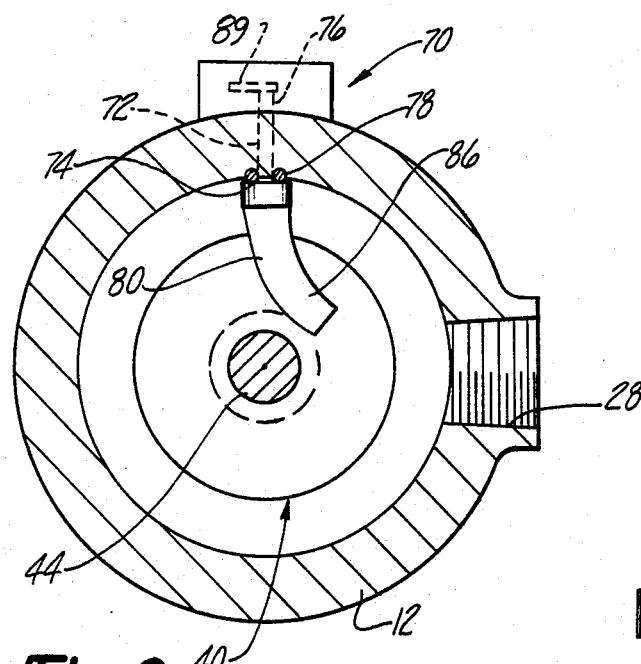
FIG. 2 is a cross-sectional view taken substantially along line 2—2 of FIG. 1.

With reference now to FIG. 2, an indicator assembly 70 provides a signal visible exteriorly of the housing 10 of the position of the valve member 40 and thus of the fluid flow rate through the device. The indicator assembly 70 is of conventional construction and includes an indicator shaft 72 rotatably mounted to the housing 10 so that one end 74 of the shaft 72 is positioned within the housing chamber 18 while its other end 76 is positioned outside the housing 10. A fluid seal 78 prevents fluid leakage from the housing chamber 18 and along the shaft 72.

An arm 80 is secured to the inner shaft end 74 and has a portion 86 (FIGS. 1 and 2) which abuts against the top of the valve member 40. Thus, axial movement of the valve member 40 rotates the shaft 72 via the arm 84.

Still referring to FIG. 2, an indicator needle 89 is secured to the outer shaft end 76 and cooperates with an indicia plate (not shown) mounted to the housing 10. The indicia plate is calibrated in fluid flow rate units corresponding to the axial position of the valve member 40. In addition, a conventional biasing assembly (not shown) maintains the arm 80 in contact with the upper surface 88 of the valve member 40.

In operation, the fluid flow rate from the pump or pressure source 34 into the inlet 22 forces the valve member first to its partially open position and then to its open position against the force of compression spring 50 in the previously described fashion. The axial position of the valve member 40 varies in dependence upon the fluid flow rate from the pressure source 34 and this fluid rate is displayed by the indicator assembly 70.

In the event that the fluid pressure ceases at the housing inlet 22 the compression spring 50 forces the valve member 40 to its closed position thus urging the planar surfaces 102 and 104 towards each other and so that the fluid seal 106 fluidly seals the valve member 40 to the housing body 12 thereby blocking reverse fluid flow from the housing outlet 28 and back to the inlet 22. Furthermore, this fluid seal 106 is sufficient to prevent reverse flow even in the event of high reverse fluid pressures.

In addition to cooperating with the valve member 40 to form the annular opening 65, the fluid seal 112 with its radially inwardly extending flap serves to clean the valve member 40 of any accumulation of dirt or other debris as the valve member 40 moves between its open and closed positions. Consequently, since the seal 112 maintains the valve matter debris-free at the valve seat, valve sticking as well as false fluid flow reading are entirely eliminated. Furthermore, since the valve member must travel from its closed and to its partially opened position before any fluid communication is established from the inlet 22 into the outlet 28, it is possible to measure very low fluid flow rates with the device of the present invention. A measurement of such low fluid flow rate is possible since significant travel of the valve member 40, i.e. from its closed and to its partially opened position, occurs before any fluid communication from the inlet 22 and to the outlet 28 occurs.

From the foregoing, it can be seen that the present invention provides a simple, inexpensive and yet highly effective combination check valve and fluid flow meter. Furthermore, the device of the present invention eliminates valve sticking and false reading by cleaning the valve member as it moves between its opened and closed position. In addition, the fluid flow meter of the present invention is capable not only of measuring very small fluid flow rates but also provides positive sealing against the extremely high reverse fluid pressures.

Having described my invention, however, many modifications thereto will become apparent to those skilled in the art to which it pertains without deviation from the spirit of the invention as defined by the scope of the appended claims.

I claim:

1. A fluid handling device comprising:
    a housing having an inlet, an outlet and a fluid passageway between said inlet and outlet,
    check valve means for preventing fluid flow through said passageway from said outlet and to said inlet, said valve means comprising a valve member and a valve seat contained in said housing, said valve seat forming a port in series with said fluid passageway, said valve member movable between an open and a closed position with respect to said valve seat,
    said valve member including a surface which cooperates with a surface on said valve seat to form an opening between said surfaces, which opening increases in area as said valve member moves from said partially open position and towards its open position,
    said valve seat including means for cleaning said first mentioned surface of said valve member as said valve member moves between said closed position and a partially open position, said cleaning means comprising a seal mounted to said valve seat and having a flap portion extending into engagement with said valve member through at least partial movement of said valve member
    means urging said valve member towards said closed position, and
    means indicating the position of said valve member exteriorly of said housing.

2. The invention as defined in claim 1 wherein said valve seat surface is substantially cylindrical, said fluid passageway extending through said valve seat, and wherein said valve member surface is substantially frusto-conical in shape, said valve member surface being spaced inwardly from said valve seat surface.

3. The invention as defined in claim 1 wherein said valve member surface is tapered.

4. The invention as defined in claim 1 wherein said valve seat and said valve member are aligned with said housing inlet.

5. The invention as defined in claim 4 wherein said valve seat comprises an annular abutment surface which extends radially outwardly from said cylindrical surface, and wherein said valve member comprises an annular enlargment which abuts against said annular abutment surface when said valve member is in said closed position.

6. The invention as defined in claim 1 wherein the area of said opening varies linearly with the movement of said valve member.

7. The invention as defined in claim 1 wherein said indicating means comprises a shaft rotatably mounted about an axis to said housing, said shaft having one end interior of said housing and its other end exterior of said housing, an arm secured to said one end of said shaft, said arm having a portion radially offset from the axis of said shaft which abuts against said valve member, an indicator needle secured to said other end of said shaft, and means for urging said arm against said valve member.

8. The invention as defined in claim 1 and comprising an elongated guide pin having one end secured to said valve member and its other end slidably received within a receiving bore in said housing, and wherein said urging means comprises a compression spring extending around said guide pin and entrapped between said housing and said valve member.

9. The invention as defined in claim 2 wherein said seal engages said valve member surface between said closed position and said partially open position.

10. The invention as defined in claim 9 wherein said valve member includes a substantially planar surface substantially perpendicular to the direction of travel of said valve member, said valve planar surface abutting against a planar surface in said housing when said valve member is in said closed position, and comprising a further seal carried by said valve member on said planar surface.

* * * * *